April 18, 1939.   W. C. BUTTNER ET AL   2,155,179
BURIED GAS SYSTEM
Filed March 11, 1938   2 Sheets-Sheet 2

Inventors
William C. Buttner
Ralph E. Evarts
by Parker & Carter
Attorneys.

Patented Apr. 18, 1939

2,155,179

UNITED STATES PATENT OFFICE 2,155,179

BURIED GAS SYSTEM

William C. Buttner, Winnetka, and Ralph E. Evarts, Chicago, Ill., assignors to The Bastian-Blessing Co., Chicago, Ill., a corporation of Illinois Application March 11, 1938, Serial No. 195,274

17 Claims. (Cl. 62—1)

This invention relates to a system and to an apparatus for storing and dispensing fluid. In the form illustrated herewith it is particularly adapted for use in the storage and dispensing of gases which are stored in buried tanks and in which the gas may be in liquid or vaporous condition or both.

One object of the invention is to provide in such an apparatus a simplified means for filling the tank.

Another object is to provide a filler means in which an assembly comprises two passages, one for liquid and one for vapors.

A still further object is to simplify and as far as possible reduce the total number of connections and openings necessary for the installation of filling, gauging and dispensing apparatus.

Other objects will appear from time to time throughout the specification and claims.

The invention is illustrated more or less diagrammatically in the accompanying drawings, wherein.

Figure 1:
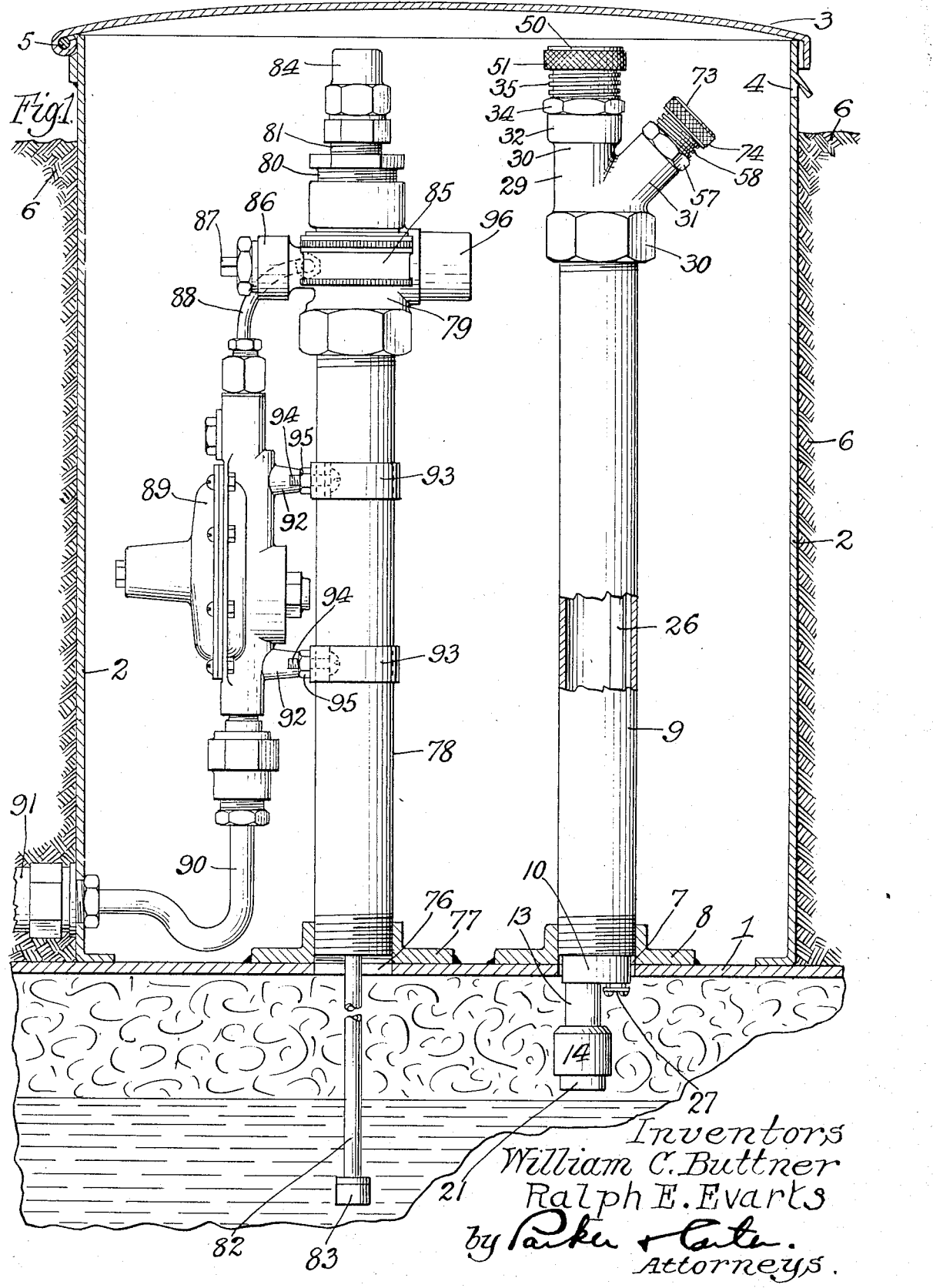
Figure 1 is a vertical section through a portion of a buried tank, illustrating the structure of the present invention.

Like parts are designated by like characters throughout the specification and claims.

Number 1 is a tank to which may be secured a casing 2, having a top or cover 3, provided with a vent 4. The top or cover may be hinged as at 5, and may be locked if desired or may be of any other suitable construction. The invention is not limited to any particular form of top or top mounting or securing. The tank, as shown, is buried in the earth 6. For many purposes it is desirable to bury the tank in the earth but the construction of the present invention may be equally well applied to a tank whether it is buried or not and whether it is stationary or movable.

As shown, the tank is provided with a filler opening 7 about which is secured by welding, riveting or otherwise, a member 8, threaded to receive the correspondingly threaded hollow filler member 9. Preferably adjacent to the lower end of the member 9 is a closure 10 which may be secured within the member 9 in any desired manner. The closure is provided with one relatively large opening 11 which terminates in an interiorly threaded extension 12, within which a relatively short pipe section 13 is threaded. At its outer end the pipe section is threaded to receive a valve housing member 14, which forms the housing of a valve which may be considered as a back pressure check valve. The housing is provided with a passage 15 which may terminate at its lower end in a valve seat 16, upon which a valve 17 is adapted to be seated. The valve is provided with a stem 18 which moves within a central supporting portion 19 which by means of a spider 20 is secured to an exteriorly threaded hollow guide member 21. This latter is threaded in corresponding threading 22 in the outer end of the housing 14. A spring 23 is positioned about the stem 18 and bears at one end upon the valve 17 and at the other end upon the member 19, and tends normally to hold the valve closed. The valve is preferably relatively light and the spring is preferably relatively weak so that the valve will normally be held closed, but may open readily.

Figure 2:
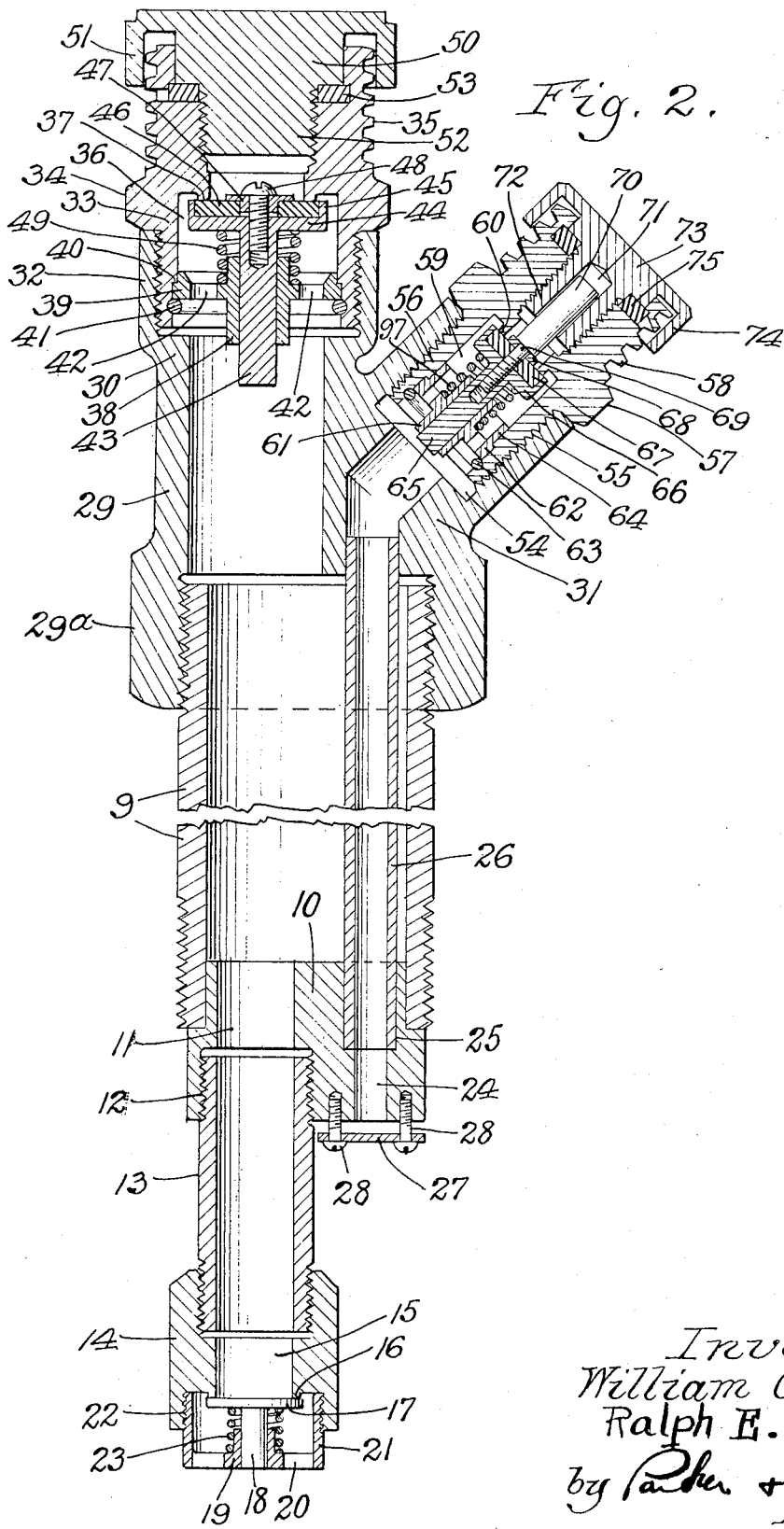
Figure 2 is a vertical section through the filler assembly on an enlarged scale with parts broken away and parts omitted.

Formed within the closure member 10 is a second passage 24 which may be enlarged as at 25 and have seated in the enlargement a vapor pipe 26. The passage 24 may have adjacent its lower end an excess flow check valve 27 which is supported upon a pair of members 28, 28. As shown here, these members are screws, screwed into the closure 10 adjacent to the passage 24. The valve member 27 is perforated and positioned upon the screws. When free to do so, the valve will lie in the open position as shown in Figures 1 and 2 but sudden outward flow or other conditions within the tank or vapor line, may cause it to rise until it contacts the housing 10 and closes the passage 24.

Adjacent its upper end, the pipe 9 is closed by a fitting 29, which as shown may have an angular cross section 29a by means of which it may be readily engaged by a tool to be secured in position or removed therefrom. The member 29 is provided wtih a filler branch 30 and the vapor branch 31. The filler branch 30 may be enlarged as at 32 and interiorly threaded to receive a filler valve assembly which includes a hollow body 33 exteriorly threaded to engage the threads in the member 32. The body is also provided with an angular cross section as at 34 for ready engagement by a tool. It is threaded exteriorly along a portion extending to its upper end as at 35. The body 33 is hollow as at 36 and is provided with a valve seat 37.

A valve stem guide 38 is carried on a perforated plate 39 which is held in place against a shoulder 40 by means of a ring or other positioning device 41. The plate 39 is preferably perforated as at 42 to provide for the passage of fluid. Within the guide portion 38 is slidably mounted a valve stem 43 which is enlarged at its outer end to provide a disc carrier 44. This carrier may be provided with a peripheral flange 45 and have seated upon it a valve disc 46 which is perforated to receive a disc retainer 47 and is itself removably held in place by a screw 48. A valve spring 49 is positioned about the stem 43 and at one end bears against the valve stem guide 38, while at the other end it bears against the member 44. When it is free to do so, the spring 49 holds the valve in the closed position shown in Figure 2, in which the disc 46 is seated upon the valve seat 37.

A body cap 50 is provided with a downwardly depending flange 51 which, when the cap is seated in the body, overlies and is out of contact with the upper portion of the thread 35. A reduced threaded member 52 is formed as a part of and preferably integrally with the cap 50. It engages corresponding threading in the hollow upper interior of the body 33. A body washer 53 may be positioned as shown beneath the head 50 and between it and the adjacent shoulder of the body 33. When the cap is in position, the passage of fluid through the valve is prevented. When it is removed a connection with a tube or hose may be made by means which preferably engage the thread 35, and fluid may be discharged into the tank through the valve, the portion 29, the tube 9 and the valve 17.

The vapor branch 31 is preferably provided with an enlarged cavity 54 threaded as at 55 to receive a valve housing 56 which is provided with an angular cross section 57 for the ready engagement of a tool. This body is threaded exteriorly as at 58. It is provided with a cavity 59 which may have a valve seat 60 formed inwardly facing within it. A stem guide 61, formed as a part of a perforated disc 62, is positioned within the hollow 59 and held in place by a retainer 63. The disc 62 may have an upwardly or inwardly extending peripheral flange 64 if desired. Positioned within the guide 61 is a valve stem 65, enlarged as at 66 to receive a valve disc 67, which is held in place by a retainer 68, which is perforated and is itself held in place by a disc retainer screw 69. The screw is provided with an elongated upper portion 70 which lies within a hollow 71 in an inward extension 72 on a body cap 73. This extension 72 is exteriorly threaded to engage corresponding threading in the body and may be provided with a downward depending peripheral flange 74 which overlies but is out of contact with a portion of the threading 58. A washer 75 may be provided if desired to prevent leakage when the cap is in place.

A spring 97 is positioned about the stem 65, bears at one end against the enlargement 66 and at the other against the guide 61 and tends normally to hold the disc 67 seated against the valve seat 60.

The tank is provided with a second opening 76, about which is secured by welding, riveting or otherwise, a member 77 into which a tube 78 is threaded. This tube serves as a dispensing opening through which fluid is discharged from the tank. At its upper end it may carry a hollow housing 79, the upper end of which may be partially closed by plug 80 in which a fitting 81 is positioned. The fitting is perforated and shaped to permit a slip gauge 82 to pass through it. The gauge, if desired, may terminate in a member 83. At its upper end it carries a handle-like portion 84 by means of which it may be moved. Any other suitable form of gauge may be positioned in the device if desired. The purpose of such a gauge is to gauge the depth of liquid within the tank.

A pressure gauge 85 may be positioned upon the housing 79 and by any desired means is connected to the interior of the housing or tank, so that it is subject to the pressure within the tank and can indicate it.

A valve of any desired form, whose details are not here shown, may be mounted in an extension 86 of the housing 79 and provided with a portion 87, exterior to the housing, by means of which the valve may be opened or closed.

A connection 88 is secured to the housing 79 at one end and at its other end is secured to a regulator assembly 89. This regulator is arranged to regulate the pressure of fluid leaving the tank and is connected on its opposite side by a connector or conduit 90 to a pipe or conduit 91 by means of which the fluid is conducted to its point of use, for example, the system in a house. As a matter of convenience the regulator housing may be provided with extensions or legs 92, 92, from which it is supported upon the member 78 by means of parts 93, 93 which encircle the member 78 and are held removably in place by bolts 94 and nuts 95.

If desired, a safety valve indicated diagrammatically as at 96 may be positioned in the system and if it is so positioned, it is preferably positioned, partially at least, within the housing 79 to be subject to the pressure therein.

Although we have shown and described an operative form of our device, it is obvious that many changes in the form, shape and arrangement of parts may be made without departing from the spirit of our invention and we wish, therefore, that our showing be taken as in a sense diagrammatic.

Where in the specification and claims reference is made to the "outlet opening of the vapor line" the opening or passage 24 is intended because that is the opening through which vapor finds the outlet from the tank; and where the expression "inlet opening" of the filling line is used, the opening 15 is intended because that is the opening through which fluid finds the inlet into the tank.

The use and operation of the invention are as follows:

The device of the present invention is generally assembled as a unit with the casing 2 permanently secured to the tank 1 and with the other parts of the assembly as shown, permanently secured in position within the casing and with respect to the tank so that after this assembly, the tank with its casing and filling and emptying means, may be treated as a unit. The functioning of the apparatus will, however, be the same whether it is assembled complete at a factory or assembled later at some point of use. Assuming that the parts have thus been assembled, the tank may be buried as shown in Figure 1, and this is a very common use of tanks of this type, although it is not the only use.

If now it be assumed that the tank and assembly as shown in Figure 1, have been buried, the pipe 91, which leads to some sort of an installed system such as the gas system in a house or other building, is connected to the member 90. If the tank is empty and is to be filled, the cover 3 will be opened, the cap 50 will be removed and means such as a filler hose from a tank car or truck will be secured through the filler connection, preferably engaging the threads 35. Similarly, the cap 73 will be removed and a vapor hose or line will be secured to the vapor connection, preferably by means of the threads 58. With the two connections thus made, the vapor return valve in the vapor connection 31 is preferably held open by contact of some part in the hose coupling with the disc retainer screw 70. Thus if liquid is discharged, it runs through the filler hose. Then the filler connection opens the valve 46, 44 and runs downwardly through the member 9, the short section 13, and finally through the valve 17, 18 into the tank, and any excess vapor pressure present in the tank passes upwardly past the excess flow check valve 27 through the pipe 26, and through the vapor valve 67, 66, thence through the vapor hose to the tank or truck for equalization. By this means a single device connected to a single fitting and a single hole in the tank forms a complete filling unit which may be treated as a unit, installed in the tank as a unit, repaired and serviced as a unit, and having the fluid filling connection and the vapor equalizing connection formed on a single member and closely adjacent to each other, simplifies the entire operation of connection to a tank or truck, filling and closing of the connections after the tank is full.

After the tank has been filled, the caps 50 and 73 are replaced, the check valves beneath them close and the filling assembly remains inactive. The pipe member 78 which contains and supports the gauge, dispensing and regulating assembly may be made of lighter material than the pipe 9 because the danger of breaking the dispensing assembly is far less than that of breaking the filling assembly because no hose is attached to it.

With the dispensing assembly as shown, some form of gauging apparatus, either the slip gauge shown, or other gauge is used, a thermometer or other temperature reading means may be used also. As a matter of convenience and simplification, the single housing member 79 is secured to the top of the pipe 78 and contains a shut-off valve by means of which the discharge of gas through the line 88 to the regulator is controlled and may be opened or shut off. This same single housing 79 also may contain or support a gauge 85, a safety valve 96 and a passage member to which the line 88 is connected. Thus, the single housing member contains all of the parts necessary for gauging and dispensing the gas and for safeguarding the system, except the final regulator through which gas passes to enter the system in the house, and this regulator is, of course, supported on the member 79 and forms thus a part of the total dispensing assembly.

With the tank full and the dispensing assembly in the position shown, the valve which lies within the housing 86, if it has not already been opened, is opened by manipulation of the member 87 and gas passes through the line 88 to the regulator 89 which is set to regulate the gas passing from it through the line 90 to the desired pressure, and thus the gas leaves the regulator and passes into the line 91 leading into the house or other point of use, properly regulated and at the desired pressure for introduction into the system.

If conditions become unsatisfactory, if pressure becomes dangerous, the safety valve 96 will operate to vent gas into the casing 2 from which it will pass either through the vent 4 or through some other opening to the open air.

We claim:

1. In a fluid storing and dispensing system, a fluid container having two openings therein, a complete unitary filling assembly positioned in one of said openings, a complete unitary dispensing assembly positioned in the other, the filling assembly including a single hollow housing, defining a filling passage, a separate vapor passage member, enclosed within said housing, a filling connection member and a vapor connection member positioned in said filling housing, the filling connection communicating with the interior of said housing, the vapor connection communicating with the interior of said vapor passage member.

2. In a fluid storing and dispensing system, a fluid container having two openings therein, a unitary filling assembly positioned in one of said openings, a unitary dispensing assembly positioned in the other, the filling assembly including a single hollow housing, defining a filling passage and a separate vapor passage member enclosed within said housing, a filling connection member and a vapor connection member positioned in said filling housing, the filling connection communicating with the interior of said housing, the vapor connection communicating with the interior of said vapor passage member, said dispensing assembly including a hollow housing positioned in the other opening in the tank and a single additional housing member secured to said dispensing housing, said additional housing member provided with suitable passages for communication with and support of a safety valve, a pressure gauge, an outlet passage member and a valve adapted to control the passage of fluid through said outlet passage.

3. In a fluid storing and dispensing system, a fluid container having two openings therein, a unitary filling assembly positioned in one of said openings, a unitary dispensing assembly positioned in the other, a casing secured to said tank, separate from and enclosing said two assemblies, a cover for said casing, said casing having a vent to the open air formed therein, the filling assembly including a single hollow housing, defining a filling passage, a separate vapor passage forming member enclosed within said housing, a filling connection member and a vapor connection member positioned in said filling housing, the filling connection communicating with the interior of said housing, the vapor connection communicating with the interior of said vapor passage.

4. In a fluid storing and dispensing system, a fluid container having two openings therein, a complete, unitary, independent filling assembly positioned in one of said openings, a complete, unitary, independent dispensing assembly positioned in the other, the filling assembly including a single hollow housing, defining a filling passage and a separate vapor passage forming member enclosed within said housing, a filling connection member and a vapor connection member positioned in said filling housing, the filling connection communicating with the interior of said housing, the vapor connection communicating with the interior of said vapor passage, a check valve in each of said connections, and back pressure check valves, one in each of said passages.

5. In a fluid storing and dispensing system, a fluid container having two openings therein, a unitary filling assembly positioned in one of said openings, a unitary dispensing assembly positioned in the other, the filling assembly including a single hollow housing, defining a filling passage, a separate vapor passage forming member enclosed within said housing, a filling connection member and a vapor connection member positioned on said filling housing, the filling connection communicating with the interior of said housing, the vapor connection communicating with the interior of said vapor passage, a check valve in each of said connections, and back pressure check valves, one in each of said passages, a depth gauge and a single additional housing member secured to said dispensing housing.

6. In a fluid storing and dispensing system, a fluid container having two openings therein, a complete, unitary filling assembly positioned in one of said openings, a complete, unitary dispensing assembly positioned in the other, the filling assembly including a single hollow housing, defining a filling passage, a separate vapor passage forming member enclosed within said housing, a filling connection member and a vapor connection member joined to filling housing, the filling connection communicating with the interior of said housing, the vapor connection communicating with the interior of said vapor passage, a check valve in each of said connections, and a back pressure check valve in each of said passages, a depth gauge and a single additional housing member secured to said dispensing housing, said additional housing member provided with suitable passages for communication with and support of a safety valve, a pressure gauge, an outlet passage member and a valve adapted to control the passage of fluid through said outlet passage.

7. In a fluid storing and dispensing system, a fluid container having two openings therein, a unitary filling assembly positioned in one of said openings, a unitary dispensing assembly positioned in the other, the filling assembly including a single hollow housing, defining a filling passage and a separate vapor passage forming member enclosed within said housing, a filling connection member and a vapor connection member connected to said filling housing, the filling connection communicating with the interior of said filling housing, the vapor connection communicating with the interior of said vapor passage, a check valve in each of said passages, and a back pressure check valve in each of said passages, a depth gauge and a single additional housing member secured to said dispensing housing, said additional housing member provided with suitable passages communicating with and supporting a safety valve, a pressure gauge, an outlet passage member and a valve adapted to control the passage of fluid through said outlet passage, a pressure regulator supported upon said dispensing housing, fluid connections from said dispensing housing to said pressure regulator and from said pressure regulator.

8. In a fluid storing and dispensing system, a fluid container having two openings therein, a filling assembly positioned in one of said openings, a dispensing assembly positioned in the other, a casing secured to said tank separate from and enclosing said two assemblies, a cover for said casing, said casing having a vent formed therein, the filling assembly including a single hollow housing, defining a filling passage and a separate vapor passage forming member supported by said housing, a filling connection member and a vapor connection member attached to said filling housing, the filling connection communicating with the interior of said housing, the vapor connection communicating with the interior of said vapor passage, a check valve in each of said passages adjacent its outer end and a back pressure check valve in each of said passages adjacent its inner end and within the tank, said dispensing assembly including a hollow housing positioned in the other opening in the tank and including a depth gauge and a single additional housing member secured to said dispensing housing, said additional housing member provided with suitable passages communicating with and supporting a safety valve, a pressure gauge, an outlet passage member and a valve adapted to control the passage of fluid through said outlet passage, a pressure regulator supported upon said dispensing housing, fluid connections from said dispensing housing to said pressure regulator and from said pressure regulator.

9. A unitary fluid conveying assembly comprising a main hollow housing member providing a passage, a separate passage member positioned within said main housing member, a closing head secured to the upper end of said housing member, said head having two conduits formed through it, one being in communication with the interior of said housing, the other being in communication with the interior of said separate passage member, check valves positioned, one in each of the passages, a single closure member closing the lower end of said main housing, said closure having two passages formed through it, one being in communication with the interior of said housing, and the other being in communication with said separate passage-member, back pressure check valves, one for said hollow housing member and one for said separate passage member.

10. A unitary fluid conveying assembly comprising a main hollow housing member providing a passage, a separate passage member positioned within said main housing member, a closing head secured to the upper end of said housing member, said head having two conduits formed through it, one being in communication with the interior of said housing, the other being in communication with the interior of said separate passage member, the latter being seated in said second conduit, check valves positioned, one in each of the passages, a single closure member closing the lower end of said main housing, said closure having two passages formed through it, one being in communication with the interior of said housing, and the other being in communication with said separate passage member, said member being seated in said second passage, back pressure check valves one for said hollow housing member and one for said separate passage forming member.

11. A unitary fluid conveying assembly comprising a main hollow housing member providing a passage, a separate passage member positioned within said main housing member, a closing head secured to the upper end of said housing member, said head having two conduits formed through it, one being in communication with the interior of said housing, the other being in communication with the interior of said separate passage member, the latter being seated at one end in said second conduit, check valves positioned, one in each of the said conduits, a single closure member closing the lower end of said main housing, said closure having two conduits formed through it, one being in communication with the interior of said housing, and the other being in communication with said separate passage member, said separate passage member being seated at one end in said second passage, back pressure check valves, one for said hollow housing member and one for said separate passage forming member, said valves positioned exteriorly of said single closure member.

12. A unitary fluid conveying assembly comprising a main hollow housing member providing a filling passage, a separate passage member positioned within said main housing member and providing a vapor return passage, a closing head secured to the upper end of said housing member, said head having two conduits, one for filling and one for vapor return, formed through it, one being in communication with the interior of said housing, the other being in communication with the interior of said separate passage member, the latter being seated at one end in said second conduit, check valves positioned, one in said filling passage and one in said vapor return passage, and spring means tending, when free to do so, to hold said valves closed, a single closure member closing the lower end of said main housing, said closure having two passages formed through it, one being in communication with the interior of said housing, and the other being in communication with said separate passage member, said separate passage member being seated at one end in said second passage of said single closure member, back pressure check valves, one for said hollow housing member and one for said separate passage forming member, said valves positioned exteriorly of said single closure member.

13. In combination as a means of forming two separate fluid passage connections through a single opening, an assembly comprising the following parts: a main hollow housing member forming one passage and shaped to be inserted into and to engage a tank opening, a separate tubular member forming another passage and positioned within said housing, a single member closing the upper end of said housing and supporting the tube, a single additional closure closing the lower end of said housing and supporting said tube, and two separate check valves for each of said separate fluid passages, one being positioned adjacent the upper end of each passage, and one adjacent the lower end of each passage.

14. As an article of manufacture, a fluid filling and pressure equalizing assembly adapted to be joined to a fluid storage tank and comprising a main hollow housing, said housing defining a filling line, a vapor conduit positioned within said housing and defining a vapor path traversing the interior of said housing, said filling line and said vapor conduit having, respectively, an inlet and an outlet at one end of said housing, the outlet opening of said vapor conduit being positioned out of line with the inlet opening of said filling line, and a back pressure check valve positioned adjacent to the inlet of vapor conduit, and means arranged to direct the discharge from the filling line away from the inlet of said vapor conduit.

15. As an article of manufacture, a fluid filling and pressure equalizing assembly adapted to be joined to a fluid storage tank and comprising a main hollow housing, said housing defining a filling line, a vapor conduit positioned within said housing and defining a vapor path traversing the interior of said housing, said filling line and said vapor conduit having, respectively, an inlet and an outlet at one end of said housing, the outlet opening of said vapor conduit being positioned out of line with the inlet opening of said filling line, and means arranged to direct the discharge from the filling line away from the inlet of said vapor conduit.

16. As an article of manufacture, a fluid filling and pressure equalizing assembly adapted to be joined to a fluid storage tank and comprising a main hollow housing, said housing defining a filling line, a vapor conduit positioned within said housing and defining a vapor path traversing the interior of said housing, said filling line and said vapor conduit having, respectively, an inlet and an outlet at one end of said housing, the outlet opening of said vapor conduit being positioned out of line with the inlet opening of said filling line, the inlet opening of said filling line being positioned further inwardly from the tank wall than is the outlet opening of the vapor conduit when the article is in position in a tank.

17. As an article of manufacture, a fluid filling and pressure equalizing assembly adapted to be joined to a fluid storage tank and comprising a main hollow housing, said housing defining a filling line, a vapor conduit positioned within said housing and defining a vapor path traversing the interior of said housing, said filling line and said vapor conduit having, respectively, an inlet and an outlet at one end of said housing, the outlet opening of said vapor conduit being positioned out of line with the inlet opening of said filling line, the outlet opening of the filling line being positioned below the inlet opening of the vapor conduit when the article is positioned vertically in a tank.

WILLIAM C. BUTTNER.
RALPH E. EVARTS.